United States Patent
Ting et al.

(10) Patent No.: US 9,791,695 B2
(45) Date of Patent: Oct. 17, 2017

(54) HEAD-UP DISPLAY MODULE

(71) Applicant: Chunghwa Picture Tubes, LTD., Taoyuan (TW)

(72) Inventors: Tzu-Yu Ting, Tainan (TW); Chuan-Tsung Su, Taoyuan (TW); Jan-Tian Lian, Keelung (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 115 days.

(21) Appl. No.: 14/735,152

(22) Filed: Jun. 10, 2015

(65) Prior Publication Data
US 2016/0363764 A1  Dec. 15, 2016

(51) Int. Cl.
G02F 1/1335 (2006.01)
G02B 27/01 (2006.01)
G02B 5/30 (2006.01)

(52) U.S. Cl.
CPC ........... *G02B 27/0101* (2013.01); *G02B 5/30* (2013.01); *G02B 27/0172* (2013.01); *G02F 1/13362* (2013.01); *G02F 1/133528* (2013.01); *G02B 2027/0118* (2013.01)

(58) Field of Classification Search
None
See application file for complete search history.

(56) References Cited

U.S. PATENT DOCUMENTS

| | | | |
|---|---|---|---|
| 5,510,913 A | 4/1996 | Hashimoto et al. | |
| 5,760,931 A * | 6/1998 | Saburi | G02B 27/0101 345/7 |
| 8,833,952 B2 | 9/2014 | Chang et al. | |
| 2006/0023315 A1* | 2/2006 | Robinson | G02B 5/305 359/630 |
| 2010/0177025 A1* | 7/2010 | Nagata | G02B 6/0028 345/76 |
| 2013/0021658 A1* | 1/2013 | Miao | G02B 27/283 359/256 |
| 2013/0050593 A1* | 2/2013 | Fujikawa | G02B 27/283 349/9 |

(Continued)

FOREIGN PATENT DOCUMENTS

| CN | 101796450 | 8/2010 |
|---|---|---|
| CN | 203909400 | 10/2014 |

(Continued)

OTHER PUBLICATIONS

"Office Action of Europe Counterpart Application", dated Oct. 10, 2016, p. 1-p. 8, in which the listed references were cited.

(Continued)

*Primary Examiner* — Ryan Crockett
(74) *Attorney, Agent, or Firm* — Jianq Chyun IP Office

(57) ABSTRACT

A head-up display module is provided. The head-up display module includes a polarized light source, an optical sheet, and a display panel. The polarized light source is capable of emitting a polarized light beam. The optical sheet is disposed on a transmission path of the polarized light beam, and the polarized light beam is reflected by the optical sheet. The display panel is disposed on the transmission path of the polarized light beam between the polarized light source and the optical sheet, and a polarization of the polarized light beam is modulated by the display panel.

14 Claims, 6 Drawing Sheets

(56) References Cited

U.S. PATENT DOCUMENTS

2013/0234005 A1  9/2013  Wang et al.
2013/0279016 A1* 10/2013 Finger .................. G02B 5/30
                                                    359/630

FOREIGN PATENT DOCUMENTS

| JP | H08179312 | 7/1996 |
| JP | 2002055302 | 2/2002 |
| JP | 2013214008 | 10/2013 |
| JP | 2014183192 | 9/2014 |
| TW | M338183 | 8/2008 |
| TW | M491842 | 12/2014 |

OTHER PUBLICATIONS

"Office Action of Taiwan Counterpart Application", dated May 2, 2016, p. 1-p. 6, in which the listed references were cited.
"Office Action of Japan Counterpart Application", dated Aug. 30, 2016, p. 1-p. 7, in which the listed references were cited.
"Office Action of Japan Counterpart Application," dated May 9, 2017, p. 1-p. 6, in which the listed references were cited.

* cited by examiner

HEAD-UP DISPLAY MODULE

BACKGROUND OF THE INVENTION

1. Field of the Invention

The present invention generally relates to a head-up display module, and more particularly, to a head-up display module having a display panel without a polarizer.

2. Description of Related Art

As the technology advances, electronic components used in transportations have been successively developed. In order to enhance traffic safety, a head-up display module had been extensively developed. Conventionally, the head-up display module allows an image light beam from a signal source such as liquid crystal display (LCD), micro display, or cathode ray tube (CRT) to be reflected by a mirror and a front windshield of a vehicle to arrive at the driver's eyes.

Nevertheless, the adaption of the foregoing mechanism currently faces the problem of low image brightness. As a result, the image projected on the front windshield is not clear to the driver and thus causes traffic safety issues. In order to overcome the problem of low image brightness, adaption of extra reflective mirrors or optical lens has been proposed. However, such technique would render a large volume module with a complex structure. Therefore, the module fabrication cost is increased. Moreover, since the brightness of the image beam would be reduced during reiterated reflections, it is required to have a high-power light source to compensate for the brightness lost. However, high-power light source would cost extra energy and as a result, the cost during operation is increased.

SUMMARY OF THE INVENTION

Accordingly, the present invention is directed to a head-up display module which may effectively improve the image quality and brightness while maintaining low energy consumption, low fabrication cost, and low volume.

The invention provides a head-up display module which includes a polarized light source, an optical sheet, and a display panel. The polarized light source is capable of emitting a polarized light beam. The optical sheet is disposed on a transmission path of the polarized light beam, and the polarized light beam is reflected by the optical sheet. The display panel is disposed on the transmission path of the polarized light beam between the polarized light source and the polarized splitter, and a polarization of the polarized light beam is modulated by the display panel.

In an embodiment of the invention, the display panel modulates the polarization of the polarized light beam from a first polarization direction to a second polarization direction, and the optical sheet reflects the polarized light beam having the second polarization direction and transmits the polarized light beam having the first polarization direction. The first polarization direction is perpendicular to the second polarization direction.

In an embodiment of the invention, the display panel does not have a polarizer.

In an embodiment of the invention, the polarized light source includes a backlight unit and an analyzer, and the analyzer is disposed between the display panel and the backlight unit.

In an embodiment of the invention, the analyzer is directly disposed on the backlight unit.

In an embodiment of the invention, the analyzer is separated from the backlight unit.

In an embodiment of the invention, the backlight unit includes a direct-type backlight unit or an edge-type backlight unit.

In an embodiment of the invention, the analyzer includes a transmissive polarizer, a reflective polarizer film, a dual brightness enhancement film (DBEF), an advanced polarizer film (APF), or a wire grid polarizer (WGP).

In an embodiment of the invention, the polarized light source includes a polarized LED.

In an embodiment of the invention, a material of the optical sheet includes glass, front windshield glass, optical film glass, or metalized film glass.

In an embodiment of the invention, the optical sheet is a single layered structure.

In an embodiment of the invention, the optical sheet and the display panel forms an included angle θ, and the included angle θ ranges between 30° to 150°.

The invention provides a head-up display module which includes a backlight unit, an analyzer, an optical sheet, and a display panel. The backlight unit is capable of emitting a light beam. The analyzer is disposed on a transmission path of the light beam, and the light beam is converted to a polarized light beam by the analyzer. The optical sheet is disposed on a transmission path of the polarized light beam, and the polarized light beam is reflected by the optical sheet. The display panel is disposed on the transmission path of the polarized light beam between the analyzer and the optical sheet, and a polarization of the polarized light beam is modulated by the display panel.

In an embodiment of the invention, the display panel modulates the polarization of the polarized light beam from a first polarization direction to a second polarization direction, and the optical sheet reflects the polarized light beam having the second polarization direction and transmits the polarized light beam having the first polarization direction. The first polarization direction is perpendicular to the second polarization direction.

In an embodiment of the invention, the display panel does not have a polarizer.

In an embodiment of the invention, the backlight unit includes a direct-type backlight unit or an edge-type backlight unit.

In an embodiment of the invention, the analyzer includes a transmissive polarizer, a reflective polarizer film, a dual brightness enhancement film (DBEF), an advanced polarizer film (APF), or a wire grid polarizer (WGP).

In an embodiment of the invention, a material of the optical sheet includes glass, front windshield glass, optical film glass, or metalized film glass.

In an embodiment of the invention, the optical sheet is a single layered structure.

In an embodiment of the invention, the optical sheet and the display panel forms an included angle θ, and the included angle θ ranges between 30° to 150°.

Based on the above, the head-up display module disclosed by the embodiments of the invention utilizes the polarization property of a light beam in combination with a display panel without polarizer to achieve enhanced image brightness. Specifically, by controlling the polarization of the light beam before the polarized light beam enters the display panel, the desired image can be projected on the optical sheet with high brightness even without the adaption of extra optical lenses. As such, the module complexity can be reduced, thereby reducing the fabrication cost of the module. On the other hand, the desired image can be displayed clearly on the optical sheet of the vehicle, and thus traffic safety can also be improved.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
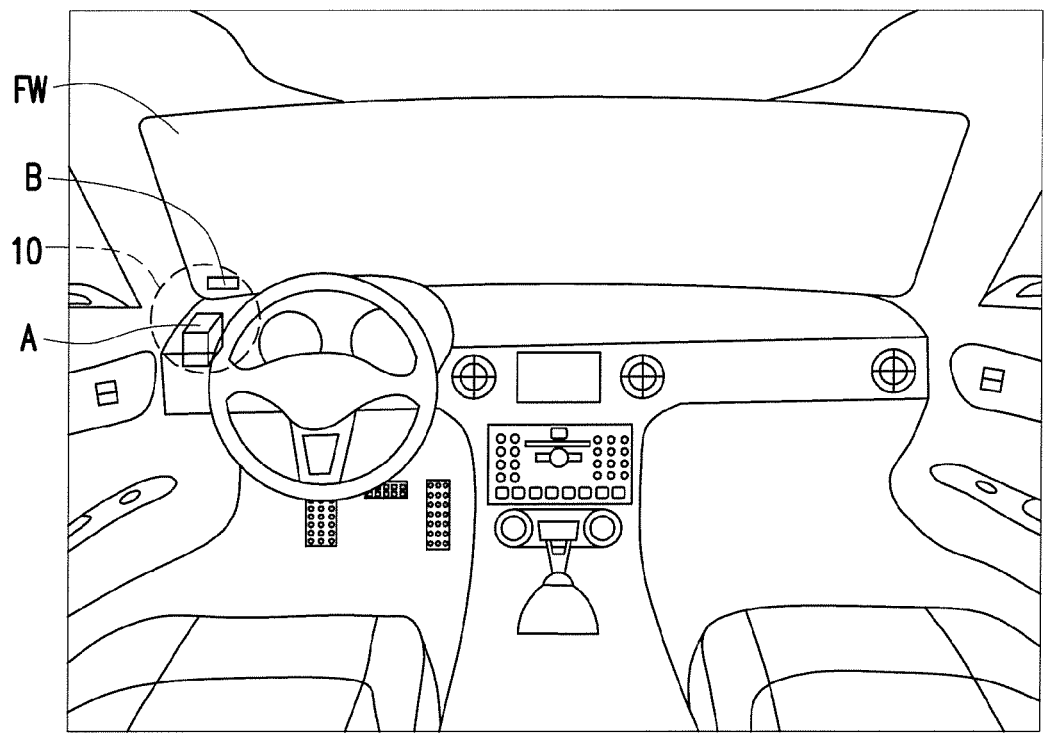
FIG. 1 is a schematic view of an interior of a vehicle including a head-up display module.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of an interior of a vehicle including a head-up display module. Referring to FIG. 1, a head-up display module 10 is disposed on the driver's side. The head-up display module 10 includes an image generation part A embedded in a dashboard and a light reflecting part B. In the present embodiment, the light reflecting part B is the front windshield FW of the vehicle, but the invention is not limited thereto. Other transflective material can also be affixed onto the front windshield FW to form the light reflecting part B of the head-up display module 10.

Figure 2A:
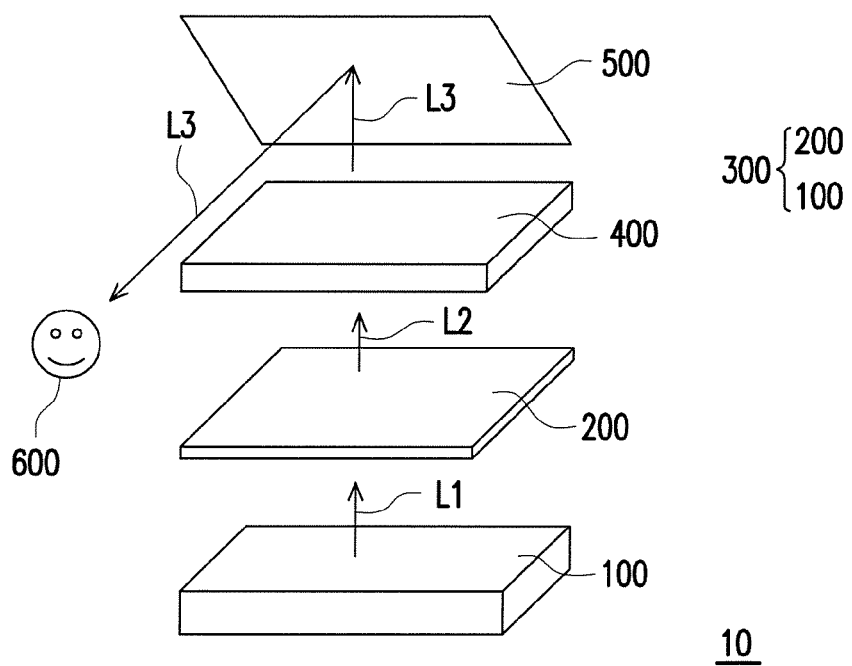
FIG. 2A is a schematic three-dimensional view of a head-up display module in a displaying mode according to an embodiment of the invention.
Figure 2B:
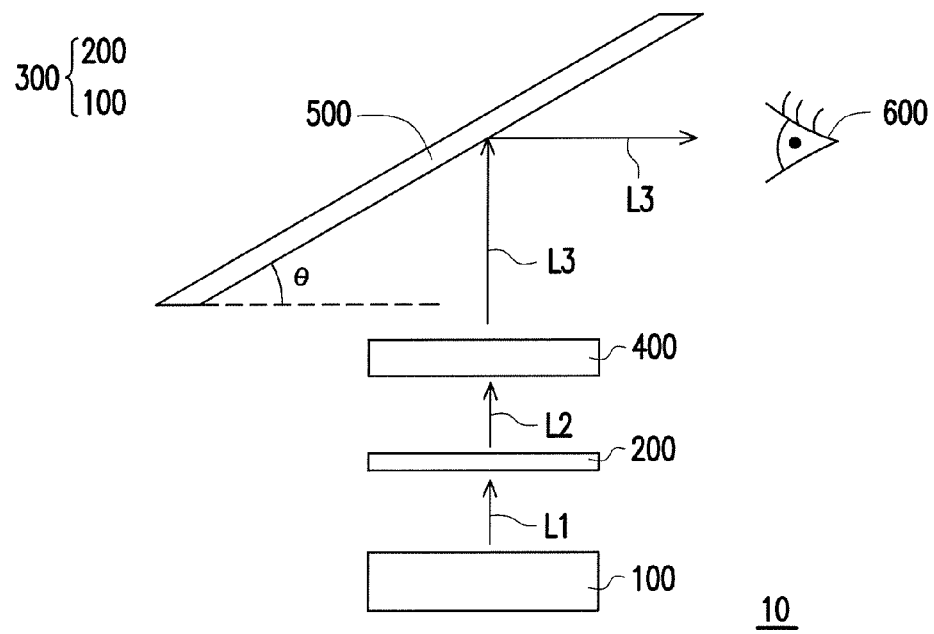
FIG. 2B is a schematic side-view of the head-up display module of FIG. 2A.

FIG. 2A is a schematic three-dimensional view of a head-up display module in a displaying mode according to an embodiment of the invention. FIG. 2B is a schematic side-view of the head-up display module of FIG. 2A. Referring to FIG. 2A and FIG. 2B simultaneously, the head-up display module 10 of the present embodiment includes a backlight unit 100, an analyzer 200, a display panel 400, and an optical sheet 500 (e.g. a glass).

The backlight unit 100 includes a direct-type backlight unit or an edge-type backlight unit, but they construe no limitation in the invention. The backlight unit 100 is capable of emitting a light beam L1. The light beam L1 is a non-polarized light and thus the polarization thereof is scattered. The analyzer 200 is disposed on a transmission path of the light beam L1. In the present embodiment, the analyzer 200 is separated from the backlight unit 100, but they construe no limitation in the invention. The analyzer 200 includes a transmissive polarizer, a reflective polarizer film, a dual brightness enhancement film (DBEF), an advanced polarizer film (APF), or a wire grid polarizer (WGP). The analyzer 200 is capable of performing linear polarization. That is, the analyzer 200 can convert a non-polarized light beam to a linear polarized light beam. Therefore, upon passing through the analyzer 200, the non-polarized light beam L1 is converted to a first polarized light beam L2. It should be noted that the first polarized light beam L2 has a first polarization direction. Moreover, in the present embodiment, the backlight unit 100 and the analyzer 200 together form a polarized light source 300.

The display panel 400 is disposed on a transmission path of the first polarized light beam L2 such that the analyzer 200 is disposed between the backlight unit 100 and the display panel 400. The display panel 400 includes a TN (Twisted Nematic) mode display panel, a STN (Super-twisted nematic) mode display panel, an IPS (In Plane Switching) mode display panel, a FFS (Fringe Field Switching) mode display panel, a MVA (multi-domain Vertical Alignment) mode display panel, a PSVA (Polymer Stabilization Vertical Alignment) mode display panel, or a transflective liquid crystal display panel. In the image displaying mode, the display panel 400 is capable of modulating a polarization of the first polarized light beam L2. In detail, when the display panel 400 is turned on, after passing through the display panel 400, the first polarized light beam L2 having the first polarization direction is modulated to a second polarized light beam L3 having a second polarization direction. Specifically, the second polarized light beam L3 is a light beam carrying image information. In other words, pixels in the display panel 400 is able to control the transmittance of the first polarized light beam L2 in each regions of the display panel 400 when the first polarized light beam L2 passes through the display panel 400 to form the second polarized light beam L3. That is, in some regions of the display panel 400, more first polarized light beam L2 passes through the display panel 400 as compare to other regions of the display panel. To take a step further, in some regions of the display panel 400, no first polarized light beam L2 is allowed to pass through. Therefore, the variation in the transmittance of the first polarized light beam L2 among different regions of the display panel 400 allows the resulting second polarized light beam L3 to constitute a light beam with image information. Herein, the first polarization direction is perpendicular to the second polarization direction. In the present embodiment, the first polarized light beam L2 is a P wave light beam and the second polarized light beam L3 is a S wave light beam, but they construe no limitation in the invention. In other embodiments, the wave type of the polarized light beams can be the other way around. The details regarding to the display panel 400 will be discussed later. It should be noted that the backlight module 100, the analyzer 200, and the display panel 400 constitute the image generation part A of the head-up display module 10 as mentioned above.

The optical sheet 500 is disposed on a transmission path of the second polarized light beam L3 such that the display panel 400 is located between the analyzer 200 and the optical sheet 500. The optical sheet 500 includes front windshield glass, optical film glass, metalized film glass, or transflective glass. In addition, the optical sheet 500 is a single layered structure. The optical sheet 500 is capable of reflecting the second polarized light beam L3 having the second polarization direction. On the other hand, the optical sheet 500 transmits the first polarized light beam L2 having the first polarization direction. In the present embodiment, since the head-up display module 10 is in displaying mode, the display panel 400 is able to perform the function of modulating the first polarized light beam L2 to the second polarized light beam L3. Subsequently, the second polarized light beam L3 is reflected by the optical sheet 500 to a driver 600. As such, a clear image formed on the optical sheet 500, or alternatively, front windshield FW in the present embodiment, can be seen by the driver 600. It should be noted that the optical sheet 500 constitute the light reflecting part B of the head-up display module 10 as mentioned above.

Referring to FIG. 2B, the optical sheet 500 and the display panel 400 forms an included angle θ, and the included angle θ ranges between 30° to 150°. Within the range, the image quality projected on the optical sheet 500 can be enhanced.

Figure 3:
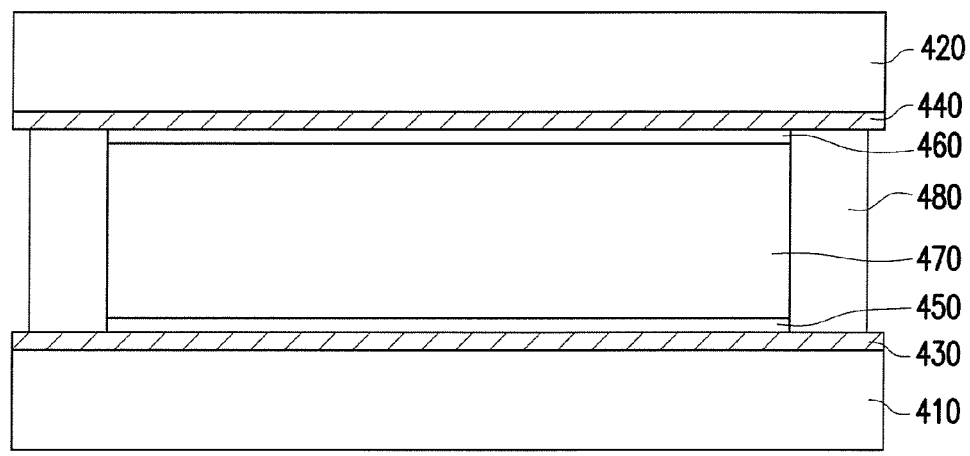
FIG. 3 is a schematic view of a display panel in the head-up display module of FIG. 2A.

FIG. 3 is a schematic view of a display panel in the head-up display module in FIG. 2A. Referring to FIG. 3, the display panel 400 includes a first substrate 410 and a second substrate 420 dispose opposite to the first substrate 410. An active layer 430 is disposed on the first substrate 410. The active layer 430 includes a plurality of scan lines, a plurality of data lines, and a plurality of pixel structures. The pixel structure includes a plurality of active devices and a plurality of pixel electrode electrically connected to the corresponding active devices. A common electrode 440 is disposed on the second substrate 420. The common electrode 440 is connected to a common voltage, and thus a constant voltage is applied to the common electrode 440. A first alignment layer 450 is disposed on the active layer 430 and a second alignment layer 460 is disposed on the common electrode 440. A display medium 470 is located between the first alignment layer 450 and the second alignment layer 460. In order to completely seal the display medium 470, a sealant 480 is provided between the first substrate 410 and the second substrate 420 such that the display medium 470 is completely sealed in the space formed by the first alignment layer 450, the second alignment layer 460, and the sealant 480.

The display medium 470 includes liquid crystal molecules, electro-phoretic display media, or other suitable display medium. In the present embodiment, the liquid crystal molecules are exemplified as the display medium 470, but it construes no limitation in the invention. In order to align the liquid crystal molecules in the display medium 470 with an initial orientation, the first alignment layer 450 and the second alignment layer 460 contacting the display medium 470 are provided. In the image displaying mode, when a voltage is applied to the pixel electrode of the active layer 430, an electric field is generated between the active layer 430 and the common electrode 440. Thus, the liquid crystal molecules in the display medium 470 are driven to orientate in a direction that is different from the initial orientation. Due to the specific orientation of the liquid crystal molecules in the display medium 470 when voltage is applied, a polarization direction of the light passing through the display medium 470 can be modulated to a linear polarization direction that is perpendicular to the original polarization direction. Therefore, the first polarized light beam L2 having the first polarization direction can be modulate to the second polarized light beam L3 having the second polarization direction after passing through the display panel 400, as illustrated in FIG. 2A and FIG. 2B.

It should be noted that unlike the conventional display panel, the display panel 400 in the present invention does not have a polarizer. Therefore, the strength of the light would not be compromised when passing through the display panel 400, thereby maintaining the brightness of the image projected onto the optical sheet 500.

Figure 4A:
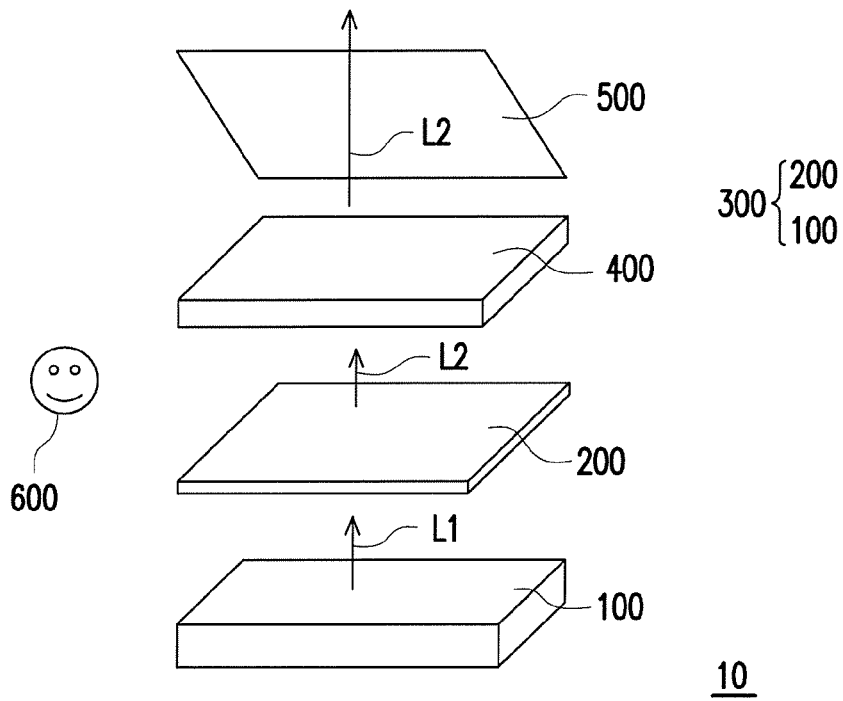
FIG. 4A is a schematic three-dimensional view of the head-up display module of FIG. 2A in a non-displaying mode.
Figure 4B:
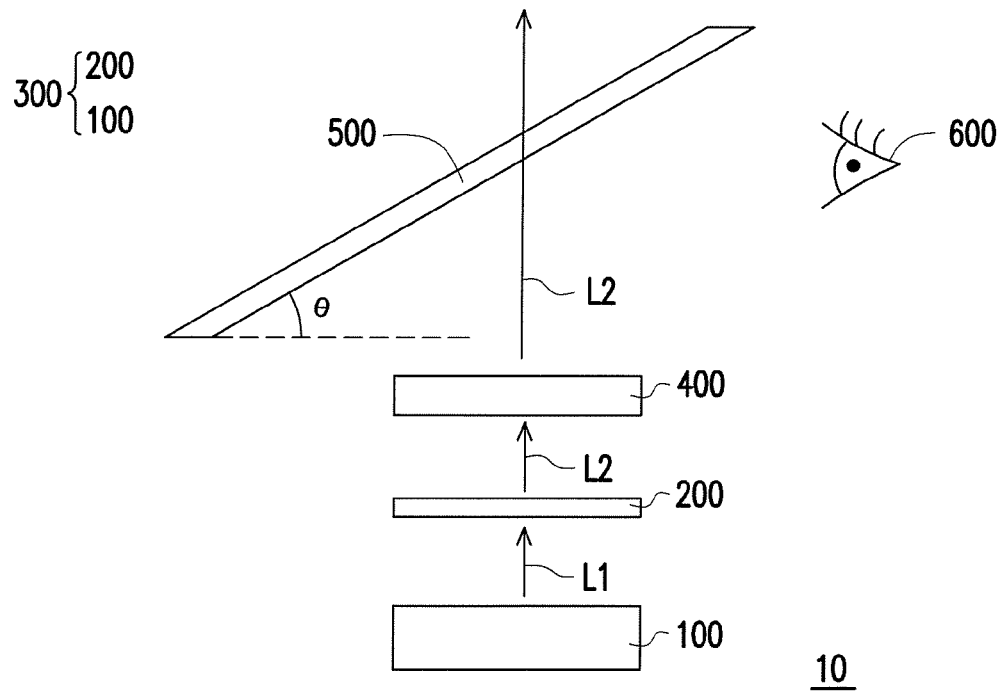
FIG. 4B is a schematic side-view of the head-up display module of FIG. 4A.

FIG. 4A is a schematic three-dimensional view of the head-up display module 10 of FIG. 2A in a non-displaying mode. FIG. 4B is a schematic side-view of the head-up display module 10 of FIG. 4A. Referring to FIG. 4A and FIG. 4B, when the head-up display module 10 is in a non-displaying mode, the display panel 400 is not turned on, and thus the first polarized light beam L2 having the first polarization direction is not being modulated when passing through the display panel 400. As a result, the first polarized light beam L2 having the first polarization direction would pass through optical sheet 500 instead of being reflected. Therefore, the first polarized light beam L2 is not reflected to the driver 600, and the image is not visible to the driver 600.

In the present embodiment, since the display panel 400 does not have a polarizer, the light beam strength is not compromised, thereby yielding higher image brightness. Moreover, by controlling the polarization of the light beam before the polarized light beam enters the display panel 400, the desired image can be projected on the optical sheet 500 with high brightness even without the adaption of extra optical lenses. As such, the module complexity can be reduced, thereby reducing the fabrication cost of the module.

Figure 5A:
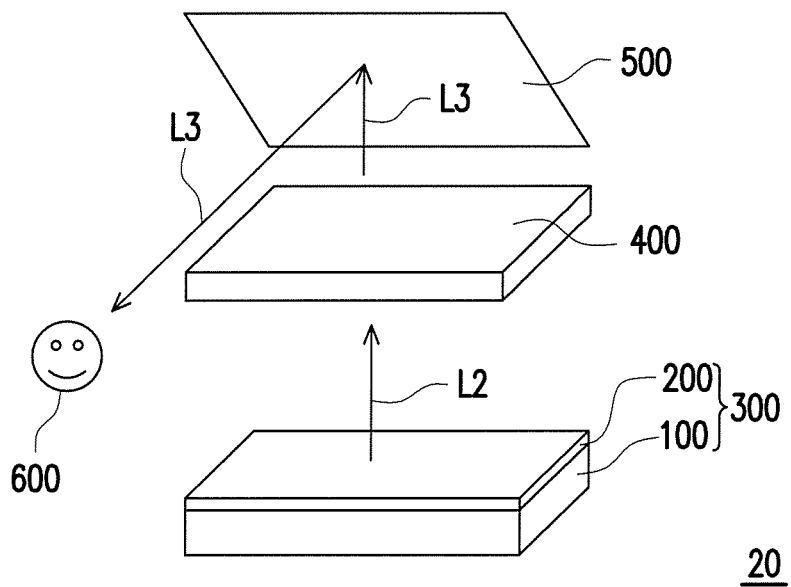
FIG. 5A is a schematic three-dimensional view of a head-up display module in a displaying mode on according to another embodiment of the invention.
Figure 5B:
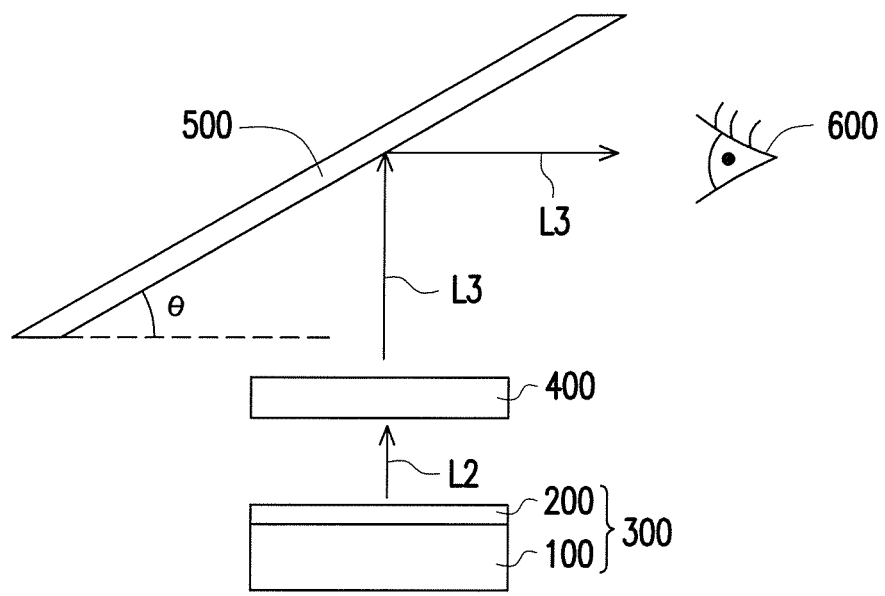
FIG. 5B is a schematic side-view of the head-up display module of FIG. 5A.

FIG. 5A is a schematic three-dimensional view of a head-up display module in a displaying mode on according to another embodiment of the invention. FIG. 5B is a schematic side-view of the head-up display module of FIG. 5A. The head-up display module 20 provided in the present embodiment is similar to the head-up display module 10 depicted in FIG. 2A, and therefore identical devices in these figures will be denoted with the same numerals and will not be further described hereinafter. The difference between the two embodiments respectively shown in FIG. 5A and FIG. 2A lies in that in the present embodiment, the analyzer 200 is directly disposed on the backlight unit 100 to form the polarized light source 300. In other words, in the present embodiment, the light beam emitted from the polarized light source 300 is already a polarized light, namely the first polarized light beam L2 having the first polarization direction.

Similar to the head-up display module 10 of FIG. 2A, in the display mode, the display panel 400 modulates the first polarized light beam L2 to the second polarized light beam L3. The optical sheet 500 reflects the second polarized light beam L3 such that the second polarized light beam L3 is transmitted to the driver 600, thereby allowing the driver 600 to see a clear image with high brightness and favourable contrast.

Figure 6A:
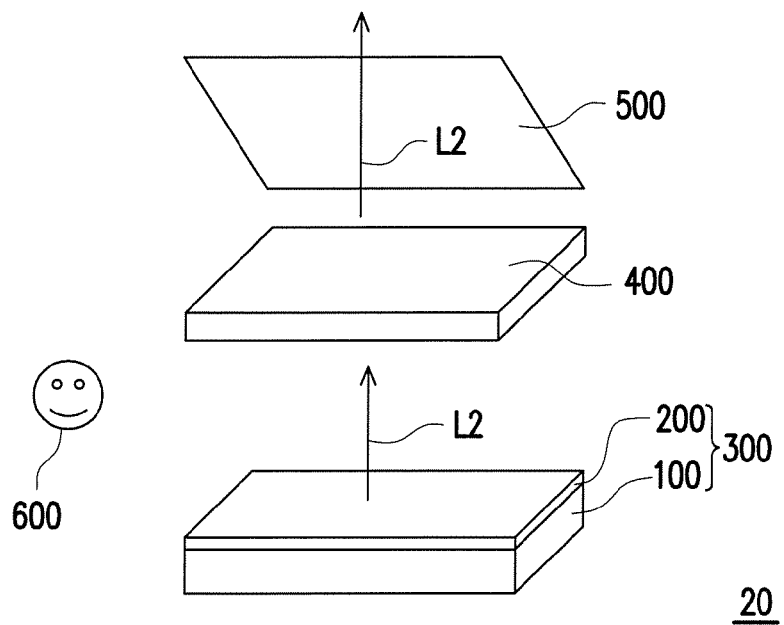
FIG. 6A is a schematic three-dimensional view of the head-up display module of FIG. 5A in a non-displaying mode.
Figure 6B:
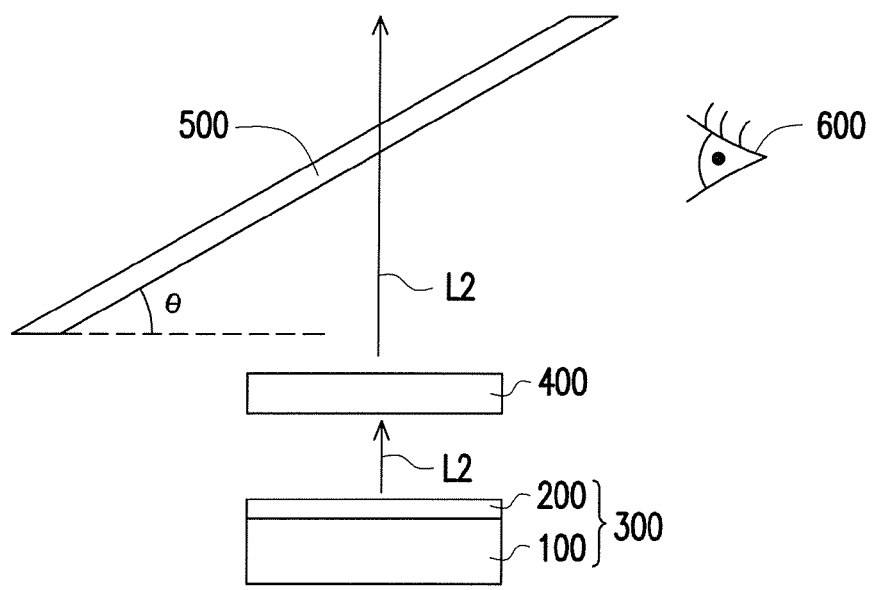
FIG. 6B is a schematic side-view of the head-up display module of FIG. 6A.

FIG. 6A is a schematic three-dimensional view of the head-up display module of FIG. 5A in a non-displaying mode. FIG. 6B is a schematic side-view of the head-up display module of FIG. 6A. Similar to the head-up display module 10 of FIG. 4A, when the head-up display module 20 in the present embodiment is in a non-displaying mode, the display panel 400 is not turned on, and thus the first polarized light beam L2 having the first polarization direction is not being modulated when passing through the display panel 400. As a result, the first polarized light beam L2 having the first polarization direction would pass through optical sheet 500 instead of being reflected. Therefore, the first polarized light beam L2 is not reflected to the driver 600, and the image is not visible to the driver 600.

In the present embodiment, by controlling the polarization of the light beam before the polarized light beam enters the display panel 400, the desired image can be projected on the optical sheet 500 with high brightness even without the adaption of extra optical lenses. As such, the module complexity can be reduced, thereby reducing the fabrication cost of the module.

Figure 7:
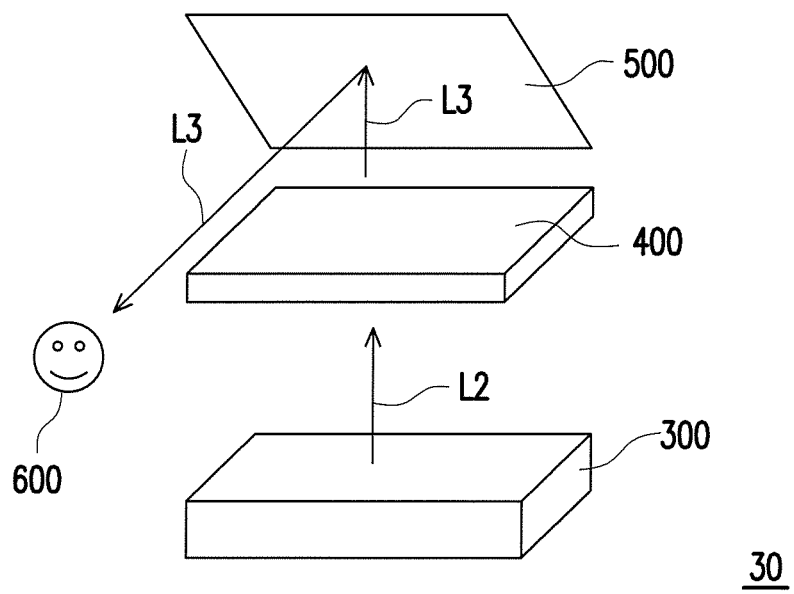
FIG. 7 is a schematic three-dimensional view of a head-up display module in a displaying mode according to one other embodiment of the invention.
Figure 8:
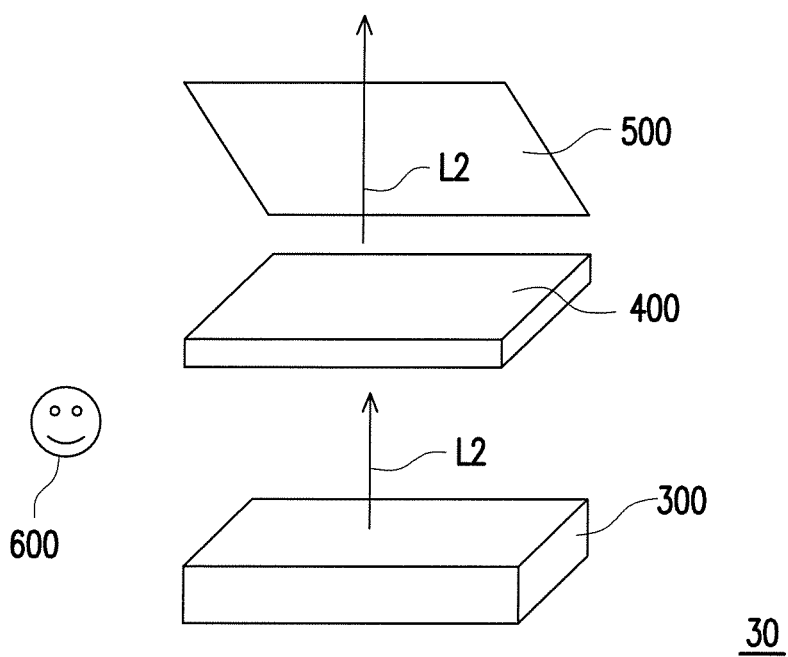
FIG. 8 is a schematic three-dimensional view of the head-up display module of FIG. 7 in a non-displaying mode.

FIG. 7 is a schematic three-dimensional view of a head-up display module in a displaying mode according to one other embodiment of the invention. FIG. 8 is a schematic three-dimensional view of the head-up display module of FIG. 7 in a non-displaying mode. The head-up display module 30 provided in the present embodiment is similar to the head-up display module 10 depicted in FIG. 2A, and therefore identical devices in these figures will be denoted with the same numerals and will not be further described hereinafter. The difference between the two embodiments respectively shown in FIG. 7 and FIG. 2A lies in that in the present embodiment, the polarized light source 300 is a polarized LED. In other words, in the present embodiment, no analyzer is disposed between the display panel 400 and the polarized light source 300. Specifically, the light beam emitted from the polarized light source 300 is already a polarized light, namely the first polarized light beam L2 having the first polarization direction. Similar to the head-up display module 10 of FIG. 2A, in the display mode, the display panel 400 modulates the first polarized light beam L2 to the second polarized light beam L3. The optical sheet 500 reflects the second polarized light beam L3 such that the second polarized light beam L3 is transmitted to the driver 600, thereby allowing the driver 600 to see a clear image with high brightness. On the other hand, when the head-up display module 30 in the present embodiment is in a non-displaying mode as illustrated in FIG. 8, the display panel 400 is not turned on, and thus the first polarized light beam L2 having the first polarization direction is not being modulated when passing through the display panel 400. As a result, the first polarized light beam L2 having the first polarization direction would pass through optical sheet 500 instead of being reflected. Therefore, the first polarized light beam L2 is not reflected to the driver 600, and the image is not visible to the driver 600.

In the present embodiment, by controlling the polarization of the light beam before the polarized light beam enters the display panel 400, the desired image can be projected on the optical sheet 500 with high brightness even without the adaption of extra optical lenses. As such, the module complexity can be reduced, thereby reducing the fabrication cost of the module.

Based on the foregoing, the head-up display module disclosed by the embodiments of the invention utilizes the polarization property of a light beam in combination with a display panel without polarizer to achieve enhanced image brightness. Specifically, by controlling the polarization of the light beam before the polarized light beam enters the display panel, the desired image can be projected on the optical sheet with high brightness even without the adaption of extra optical lenses. As such, the module complexity can be reduced, thereby reducing the fabrication cost of the module. On the other hand, the desired image can be displayed clearly on the optical sheet of the vehicle, and thus traffic safety can also be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A head-up display module, comprising:
a polarized light source capable of emitting a polarized light beam;
an optical sheet disposed on a transmission path of the polarized light beam, wherein the polarized light beam is reflected by the optical sheet, wherein a material of the optical sheet comprises front windshield glass; and
a display panel disposed on the transmission path of the polarized light beam between the polarized light source and the optical sheet, wherein a polarization of the polarized light beam is modulated by the display panel,
wherein the display panel modulates the polarization of the polarized light beam from a first polarization direction to a second polarization direction, the optical sheet reflects the polarized light beam having the second polarization direction and transmits the polarized light beam having the first polarization direction, and the first polarization direction is perpendicular to the second polarization direction, and
wherein the display panel does not have a polarizer.
2. The head-up display module of claim 1, wherein the polarized light source comprises a backlight unit and an analyzer, and the analyzer is disposed between the display panel and the backlight unit.
3. The head-up display module of claim 2, wherein the analyzer is directly disposed on the backlight unit.
4. The head-up display module of claim 2, wherein the analyzer is separated from the backlight unit.
5. The head-up display module of claim 2, wherein the backlight unit comprises a direct-type backlight unit or an edge-type backlight unit.
6. The head-up display module of claim 2, wherein the analyzer comprises a transmissive polarizer, a reflective polarizer film, a dual brightness enhancement film (DBEF), an advanced polarizer film (APF), or a wire grid polarizer (WGP).
7. The head-up display module of claim 1, wherein the polarized light source comprises a polarized LED.
8. The head-up display module of claim 1, wherein the optical sheet is a single layered structure.
9. The head-up display module of claim 1, wherein the optical sheet and the display panel forms an included angle θ, and the included angle θ ranges between 30° to 150°.
10. A head-up display module, comprising:
a backlight unit capable of emitting a light beam;
an analyzer disposed on a transmission path of the light beam, wherein the light beam is converted to a polarized light beam by the analyzer;
an optical sheet disposed on a transmission path of the polarized light beam, wherein the polarized light beam is reflected by the optical sheet, wherein a material of the optical sheet comprises front windshield glass; and
a display panel disposed on the transmission path of the polarized light beam between the analyzer and the optical sheet, wherein a polarization of the polarized light beam is modulated by the display panel, wherein the display panel modulates the polarization of the polarized light beam from a first polarization direction to a second polarization direction, the optical sheet reflects the polarized light beam having the second polarization direction and transmits the polarized light beam having the first polarization direction, and the first polarization direction is perpendicular to the second polarization direction, and wherein the display panel does not have a polarizer.

11. The head-up display module of claim 10, wherein the backlight unit comprises a direct-type backlight unit or an edge-type backlight unit.

12. The head-up display module of claim 10, wherein the analyzer comprises a transmissive polarizer, a reflective polarizer film, a dual brightness enhancement film (DBEF), an advanced polarizer film (APF), or a wire grid polarizer (WGP).

13. The head-up display module of claim 10, wherein the optical sheet is a single layered structure.

14. The head-up display module of claim 10, wherein the optical sheet and the display panel forms an included angle θ, and the included angle θ ranges between 30° to 150°.

* * * * *